Nov. 27, 1923.

W. J. EGAN 1,475,375

BABY CARRIAGE

Filed April 16, 1923

Inventor.
William John Egan.
By R. Sniger. Atty.

Patented Nov. 27, 1923.

1,475,375

UNITED STATES PATENT OFFICE.

WILLIAM JOHN EGAN, OF GEELONG, VICTORIA, AUSTRALIA.

BABY CARRIAGE.

Application filed April 16, 1923. Serial No. 632,520.

*To all whom it may concern:*

Be it known that I, WILLIAM JOHN EGAN, a subject of the King of Great Britain, residing at Geelong, Victoria, Australia, have invented new and useful Improvements in and Connected with Baby Carriages, of which the following is a specification.

My invention relates to the construction of baby carriages, and more particularly to the suspension of the body in the frame, of the type having an undercarriage or framework brazed or otherwise held upon the wheel axles and wherein the body of the vehicle is based upon springs.

According to the invention, I place the carriage body on springy plates, those at the rear being attached to a crossbar in the frame below the handles. The rear suspension is such that the plates can be inclined by rotating the cross bar to which same are attached. At the front the body is borne upon and attached to a transverse plate suspended in compression springs that are held on bolts hung from the extremities of the frame.

In the accompanying drawings—

Figure 1:
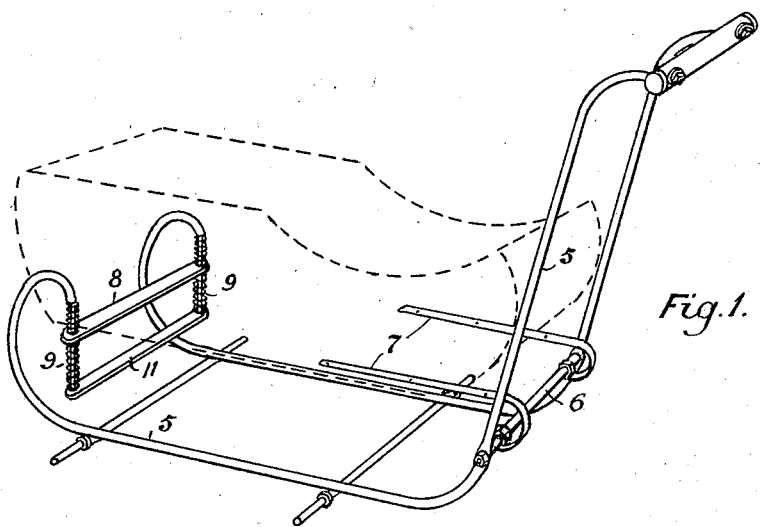
Fig. 1 is a perspective view of the frame and supporting spring and rear plates, the body being shown in dotted lines.
Figure 2:
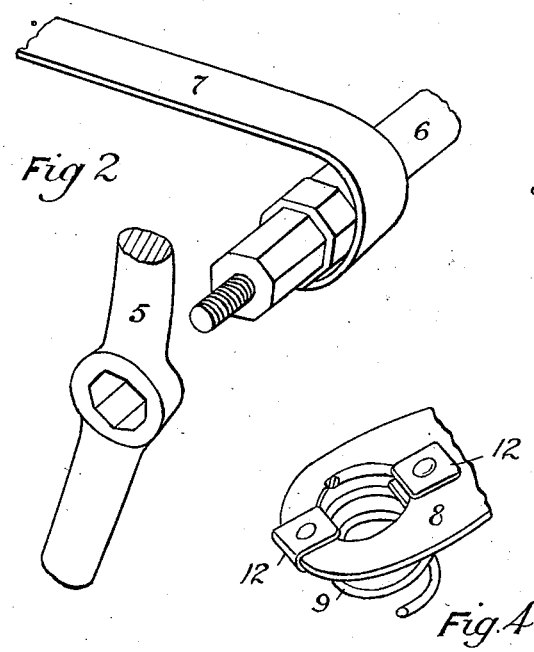
Fig. 2 illustrates, in perspective, a detail view of a part of the rear springing means.
Figure 3:
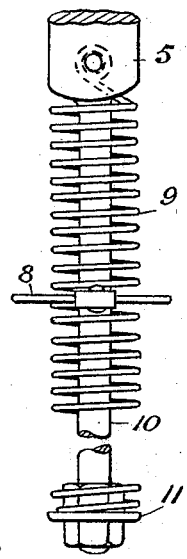
Fig. 3 shows in side elevation a forward cushion spring with the transverse plate secured thereto.
Figure 4:
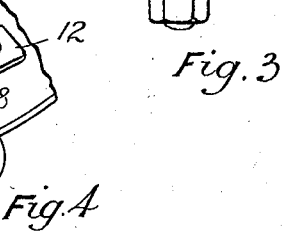
Fig. 4 is a perspective detail of such spring showing the said plate attached.

The undercarriage or frame 5 may be made in one piece with the handles, and is secured to the wheel axles. Towards the lower part of the frame at the rear below the handles, a bar 6 is transversely held in the frame. On this bar are the springy plates 7 that curve from their supports and project forwardly under the carriage body to which they are secured. The member 6, where it is bolted to the frame 5, is preferably formed with flat sides to be accommodated in like holes in the frame members, as illustrated in Fig. 2 of the drawings. This is to enable the pitch or inclination of the springy plates 7 to be altered or adjusted according to the load same are required to bear. If the holding nuts be removed and the bar be disengaged from the frame, it can be turned, reinserted therein and again secured.

The plates 7 will serve as the rearward or main support of the carriage body but which also rests at the front upon the transverse floating plate 8 that is suspended on the springs 9 that are about the bolts 10 which hang from the forward ends of the frame 5. To the plate 6 the body is bolted and a further cross member 11 steadies the bolts at the lower ends.

The plate 8 is bored at the ends to allow the bolts and springs 9 to pass through it and it is held to the springs by clips 12 or in any other convenient manner: or the springs 9 may be cut into two parts, with each part resting against the plate 8 in slight compression, while the plate will be guided by and adapted to slide upon the vertical bolts 10.

Thus, the carriage body will be borne upon springy members at the front and rear, having different tensions, but each sufficiently resilient to ensure comfort to the occupant of the carriage. As the body is secured to the springy plates 7, the latter will be tensioned when the forward part of the body is secured to the plate 8. The suspension may be used in frames other than children's perambulators and can be readily adapted to the suspension of side car bodies in their frames.

Having now described my invention what I claim as new and desire to secure by Letters Patent is:—

1. In a carriage suspension, a frame work, a transverse bar inserted on the frame work, a body, springy plates connected to the bar at one end and attached to the other end of the body, vertical bolts supported by the frame work and arranged under the end of the body opposite to that to which said springy plates are attached, a floating transverse plate secured to the body and guided on said vertical bolts and springs on said bolts above and below and bearing against said transverse plates.

2. In a baby carriage suspension of the kind indicated, wherein the front of the body rests on a floating transverse plate, bolts depending from the extremities of the frame that pass through the plate, springs about the bolts above and below said plate and attached thereto and a steadying bar between the lower extremities of the bolts.

In testimony whereof I have signed my name to this specification.

WILLIAM JOHN EGAN.